United States Patent
Nuijts et al.

(10) Patent No.: US 9,331,844 B2
(45) Date of Patent: May 3, 2016

(54) SYSTEM AND METHOD FOR NETWORK SYNCHRONIZATION AND FREQUENCY DISSEMINATION

(75) Inventors: Roeland Johannus Marie Wilhelm Nuijts, De Meern (NL); Jeroen Cornelis Jean Koelemeij, Amstelveen (NL)

(73) Assignee: STICHTING VU-VUMC, Amsterdam (NL)

( * ) Notice: Subject to any disclaimer, the term of this patent is extended or adjusted under 35 U.S.C. 154(b) by 100 days.

(21) Appl. No.: 14/119,688

(22) PCT Filed: May 24, 2012

(86) PCT No.: PCT/NL2012/050367
§ 371 (c)(1),
(2), (4) Date: Feb. 10, 2014

(87) PCT Pub. No.: WO2012/161581
PCT Pub. Date: Nov. 29, 2012

(65) Prior Publication Data
US 2014/0199072 A1  Jul. 17, 2014

Related U.S. Application Data

(60) Provisional application No. 61/489,286, filed on May 24, 2011.

(51) Int. Cl.
*H04J 14/00* (2006.01)
*H04L 7/00* (2006.01)
(Continued)

(52) U.S. Cl.
CPC .............. *H04L 7/0075* (2013.01); *H04J 3/0682* (2013.01); *H04J 14/02* (2013.01); *H04J 14/0272* (2013.01); *H04J 14/0275* (2013.01)

(58) Field of Classification Search
CPC ..... H04J 14/0209; H04J 14/02; H04J 14/022; H04J 14/0234; H04J 3/0682; H04J 14/0272; H04J 14/0275; H04B 10/077; H04B 10/0775; H04B 10/07; H04B 10/0795; H04B 2210/078; H04L 43/0864; H04L 7/0075; H04Q 2011/0016
USPC ......... 398/75, 79, 30, 31, 32, 33, 85, 98, 154, 398/155
See application file for complete search history.

(56) References Cited

U.S. PATENT DOCUMENTS 5,673,133 A * 9/1997 Imaoka et al. ................ 398/202
6,128,083 A * 10/2000 Nogami ........................ 356/498
(Continued)

FOREIGN PATENT DOCUMENTS

EP  0 738 055 A2  10/1996

OTHER PUBLICATIONS

International Search Report, PCT/NL2012/050367, mailed Sep. 24, 2012, 3 pages.
(Continued)

*Primary Examiner* — Hibret Woldekidan
(74) *Attorney, Agent, or Firm* — Thompson Hine LLP (57) ABSTRACT

Distribution of reference frequency and timing information in a network involves determining latency between a first and second node from time delay between transmission of a reference frequency and timing signal and reception of an optical return timing signal in response. In a network with pairs of first and second optical fibers in optical fiber connections between network nodes, for transmission of optical data signals separately in mutually opposite directions between the network nodes respectively, provisions are made to transmit the reference frequency and timing signal and the resulting optical return signal via the same fiber, one in the same direction as the unidirectional data signal over that fiber and the other upstream. Repeaters between the nodes may be modified to pass such signals upstream and downstream. In an embodiment wherein the network provides for an optical supervisory channel, the optical filters for combining the optical supervisory channel signal with the unidirectional data signal and separating the optical supervisory channel signal from the unidirectional data signal are used to combine and separate the reference frequency and timing signal and to pass the optical return timing signal. For this purpose, further optical filters may be added outside the main optical data channel to combine and separate the reference frequency and timing signal and the optical supervisory channel and to pass the optical return signal back to the filter that separates the optical supervisory channel signal from the data signal.

20 Claims, 3 Drawing Sheets

(51) Int. Cl.
*H04J 3/06* (2006.01)
*H04J 14/02* (2006.01)

(56) References Cited

U.S. PATENT DOCUMENTS

| | | | |
|---|---|---|---|
| 6,765,659 B1* | 7/2004 | Bhatnagar et al. | 356/73.1 |
| 7,693,365 B2* | 4/2010 | Kauffman | 385/24 |
| 8,380,078 B2* | 2/2013 | Boduch et al. | 398/147 |
| 8,588,610 B2* | 11/2013 | Tanaka | 398/30 |
| 8,724,507 B2* | 5/2014 | Kang et al. | 370/254 |
| 2002/0064340 A1 | 5/2002 | Fukuchi | |
| 2002/0154358 A1* | 10/2002 | Hino | 359/124 |
| 2003/0025965 A1* | 2/2003 | Takatsu et al. | 359/124 |
| 2003/0081307 A1* | 5/2003 | Fludger et al. | 359/334 |
| 2005/0180575 A1 | 8/2005 | Maeda et al. | |
| 2006/0216028 A1* | 9/2006 | Ozawa | 398/79 |
| 2007/0258721 A1* | 11/2007 | Boduch et al. | 398/147 |
| 2010/0266285 A1 | 10/2010 | Healey et al. | |
| 2011/0076031 A1 | 3/2011 | Surek et al. | |
| 2013/0202291 A1* | 8/2013 | Cavaliere et al. | 398/33 |

OTHER PUBLICATIONS

Kéfélian et al. High-resolution optical frequency dissemination on a telecommunications network with data traffic. Optics Letters 34 (2009) pp. 1573-1575.

Lopez et al. Simultaneous remote transfer of accurate timing and optical frequency over a public fiber network. Applied Physic B Lasers and Optics 110 (2013) pp. 3-6.

International Preliminary Report on Patentability, PCT/NL2012/050367, issued Nov. 26, 2013, 7 pages.

* cited by examiner

SYSTEM AND METHOD FOR NETWORK SYNCHRONIZATION AND FREQUENCY DISSEMINATION

RELATED APPLICATIONS

This application is a National Phase of co-pending PCT/NL2012/050367 filed May 24, 2012, which claims priority to U.S. Application Ser. No. 61/489,286 filed May 24, 2011, each of which is expressly incorporated by reference herein in its entirety.

FIELD OF THE INVENTION

The present invention relates to a system and method for time and frequency synchronization in communication networks, in particular duplex optical fiber networks such as DWDM (Dense Wavelength Division Multiplexed) transmission systems.

BACKGROUND ART

The international telecommunication needs for data transmission are rapidly growing in recent years, the main drivers being video, supercomputing applications and data traffic via mobile communications. Under these conditions, terrestrial optical fiber transmission systems, such as DWDM (Dense Wavelength Division Multiplexed) transmission systems have been developed to meet the increasing demands for more cost-effective, bandwidth-rich telecommunication service. Furthermore, in order to accommodate the different types of traffic on the network (e.g. voice, data, video) and to increase the utilization of the available bandwidth in the network, network architectures migrate from circuit switched networks (which reserve bandwidth whether used or not), to packet switched networks.

Such migration implies a shift away from the synchronized network architecture, like SONET (Synchronous Optical Network) and SDH (Synchronous Digital Hierarchy). SONET and SDH were originally designed to transport circuit mode communications, e.g. DS1, DS3, from a variety of different sources. Additionally, these network architectures support real-time, uncompressed, circuit-switched voice encoded communications in a so-called PCM (Pulse Code Modulation) format. Circuits in SONET/SDH are provisioned with a fixed reserved capacity in a so-called VC (Virtual Container) inside the SONET/SDH payload. Furthermore, a network architecture such as SDH uses a basic transmission format, i.e. an STM-1 (Synchronous Transport Module, level 1) frame. The distribution of timing, and thus network synchronization, is natural. In the network nodes, a reference frequency is retrieved from a received signal via a clock recovery circuit. Only the position of the VC relative to the position of the STM-1 frame needs to be known, which results in an absence of the need of an absolute timing reference for proper circuit operation.

Packet switched networks do not use such a fixed framing architecture, and therefore do not have a natural synchronized timing distribution. In these networks data frames need to be transmitted without overlap with other frames and with as little as possible unused and stranded capacity. Therefore, packet switched networks have stringent requirements concerning frequency dissemination as well as phase and time synchronisation to guarantee proper call connection and data transport, such as, for example, transfer of streamed data. These communication networks thus do need an absolute timing reference.

As the vast majority of mobile backhaul networks are upgraded to (Carrier) Ethernet, the base stations become unsynchronized. The use of GPS (Global Positioning System) receivers for providing an absolute timing reference, such as time of day information, in combination with a local oscillator for providing a reference frequency could be a solution. However, this approach is expensive and can easily be tampered with. Currently, the two most widely used methods to synchronize the base stations are 1) the ITU-T Synchronous Ethernet (G.8261) protocol and 2) the so-called Precision Time Protocol (PTP) described in IEEE-Standard 1588 version2.

The Synchronous Ethernet solution is centered on very similar frequency dissemination as used for SONET/SDH networks. That is the frequency in each network node is derived from the frequency from upstream nodes. In terms of frequency, the Synchronous Ethernet solution provides excellent frequency synchronization of the nodes in the network between base stations. However, Synchronous Ethernet is not capable of providing accurate time and phase information as is needed in packet networks. For example, Synchronous Ethernet does not take effects such as latency into account.

PTP is also similar to the SONET NTP (Network Time Protocol). PTP is a 2-way time transfer protocol with hardware time stamping. The master and slave end-points transport the timing information within MAC (Media Access Control) frames. Using PTP avoids the need to upgrade the intermediate nodes. Furthermore, PTP enables time and day synchronization, which is required for Time Division Duplex (TDD) mobile networks. However, to use PTP, additional hardware and boundary clocks are needed for regeneration and jitter compensation of timing signals in extensive networks. Furthermore, with PTP only limited synchronization accuracy can be achieved, typically of the order of 1 microsecond.

SUMMARY

It is an object to provide accurate timing to nodes in a packet based telecommunication network, In embodiments it is a further object to do so in particular for a telecommunication network for next generation mobile devices, with an improved performance compared to techniques used in present day SDH/SONET or GPS timing packet-based mobile networks.

According to a first aspect a method according to claim 1 is provided. Herein a network that uses different optical fibers of a fiber connection to transmit telecommunication data back and forth between nodes unidirectionally in each fiber, is modified to transmit timing data and a response to that timing data back and forth over a same one of these fibers. This provides for better synchronization accuracy. In an embodiment synchronization comprises transmission, from the first node, of a timing signal by a first clock, followed by detection of this timing signal in the second node by a second clock and correction of the offset of the second clock's counter for latency, that is, the propagation delay experienced by the timing signal during transmission. The optical return timing may be used to determine the time period that has elapsed between sending an optical frequency and timing signal and receiving the optical return timing signal over the same fiber. The latency of the signal transfer then equals the corrected time period divided by two. A first and second timing signal are used. In an embodiment these are a reference frequency and timing signal generated in the first node and an optical return signal generated in the second node, in response to the reference frequency and timing signal. In an embodiment of the method according to claim 1, an updated reference frequency and timing signal including the latency information may be generated and transmitted to the second node.

In an embodiment mutually different wavelengths are used for back and forth transmission of the timing data and the response. This prevents unwanted cross talk between upstream and downstream data due to Rayleigh scattering.

In an embodiment wherein an optical amplifier system is used in the fiber connection between nodes, the optical amplifier system is modified to allow for a small amount of upstream optical traffic over one of the fibers of the fiber connection, compared to the amount of main downstream traffic over that fiber. In a further embodiment, filters that may already be present to split off and combine light for an optical supervisory channel (OSC) may be used to handle the upstream traffic. This makes it unnecessary to intervene with the main telecommunication traffic over the fiber.

In a further embodiment optical network nodes for two-way optical traffic by unidirectional transmission in different directions over respective different fibers of a fiber pair are modified to provide for an amount of upstream traffic for two way communication of timing signals over the same one of the fibers. In a further embodiment, filters that may already be present to split off and combine light for an OSC channel may be used to handle the upstream traffic.

SHORT DESCRIPTION OF DRAWINGS

Various aspects of the invention will be further explained with reference to embodiments shown in the drawings wherein.

DETAILED DESCRIPTION OF THE PREFERRED EMBODIMENT

An embodiment of the invention provides an optical filter for use in a transmitter in a Dense Wavelength Division Multiplexed, DWDM, transmission system, the optical filter comprising: a first port for communicative coupling to a reference frequency and timing circuit; a second port for communicative coupling to an optical supervisory channel, OSC, transmitter unit; and a third port for communicative coupling to a further optical filter arranged for enabling transmission of DWDM optical data over an optical fiber; wherein the optical filter is arranged for: receiving a reference frequency and timing signal via the first port; receiving an OSC signal via the second port; combining the frequency and timing reference signal and the OSC signal so as to form a combined signal; transmitting the combined signal towards the further optical filter via the third port. The reference frequency and timing signal that is combined with the OSC-signal enables a receiver that receives the combined signal to determine the clock frequency used in the node where the filter is located as well as the absolute time at which the signal is generated. Based on this information, a synchronization accuracy in a network using PTP can be improved. The addition of such optical filter to a transmitter in a DWDM transmission network can be executed without interruption of data traffic Consequently, the timing and frequency signal can be added to an existing DWDM transmission system without substantially affecting its performance.

In some embodiments, the filter may be further arranged for: receiving an optical return timing signal via the third port; and forwarding the optical return timing signal towards the reference frequency and timing circuit via the first port. Based on the information in the optical return timing signal the reference frequency and timing circuit may determine the latency of data transfer between two nodes. The determined latency may then be included in the reference frequency and timing signal to improve the synchronization accuracy even further, in some cases a synchronization accuracy down to the order of 10 ns may be achieved.

Some embodiments of the invention further relate to a transmitter for use in a DWDM transmission system, the transmitter comprising: a reference frequency and timing circuit for generating a reference frequency and timing signal; an optical supervisory channel, OSC, transmitter unit for generating an OSC signal; an optical filter as described above for combining the reference frequency and timing signal and the OSC signal so as to form a combined signal; a DWDM optical data transmission unit for generating a signal comprising DWDM optical data; and a further optical filter for combining the signal DWDM optical data comprising signal and the combined signal. The reference frequency and timing circuit, as well as the optical filter, can be added to the transmitter without interruption of DWDM optical data traffic.

Some embodiments of the invention relate to an optical filter for use in a receiver in a Dense Wavelength Division Multiplexed, DWDM, transmission system, the optical filter comprising: a first port for communicative coupling to a reference frequency and timing circuit; a second port for communicative coupling to an optical supervisory channel, OSC, receiver unit; and a third port for communicative coupling to a further optical filter arranged for enabling transmission of DWDM optical data over an optical fiber; wherein the optical filter is arranged for receiving a combined signal from the further optical filter via the third port; separating the combined signal into a reference frequency and timing signal and an OSC signal; transmitting the reference frequency and timing signal to the reference frequency and timing circuit via the first port; and transmitting the OSC signal to the OSC receiver unit via the second port. The reference frequency and timing signal enables determination of the clock frequency used in the node where the signal originates from as well as the absolute time at which the signal was generated. Based on this information, a synchronization accuracy in a network using PTP can be improved. The addition of such optical filter to a receiver in a DWDM transmission network can be executed without interruption of data traffic.

In some embodiment, the filter is further arranged for: receiving an optical return timing signal via the first port; and forwarding the optical return timing signal towards the further optical filter via the third port. Based on the information in the optical return timing signal the latency of data transfer between two nodes may be determined. The determined latency may then be included in an updated reference frequency and timing signal to improve the synchronization accuracy even further, in some cases a synchronization accuracy down to the order of 10 ns may be achieved.

Some embodiments of the invention relate to a receiver for use in a Dense Wavelength Division Multiplexed, DWDM, transmission system, the receiver comprising: an optical frequency and timing retrieving unit arranged for communication with a remote timing and frequency unit circuit for retrieving a frequency and timing reference signal; an optical supervisory channel, OSC, receiver unit for receiving an OSC signal; a DWDM optical data receiving unit for processing a signal comprising DWDM optical data; an optical filter for separating an optical DWDM data signal from a combined signal comprising a reference frequency and timing signal and an OSC signal, and forwarding the separated optical DWDM data signal to the DWDM optical data receiving unit; and a further optical filter as described above for separating the reference frequency and timing signal from the OSC signal, and for transmitting the reference frequency and timing signal to the optical frequency and timing retrieving unit, and for transmitting the OSC-signal to the OSC receiver unit.

Some embodiments of the invention relate to an amplifier system for time and frequency distribution in a Dense Wavelength Division Multiplexed, DWDM, network, the system comprising: a first port for connection to a first optical fiber; a second port for connection to a second optical fiber; an optical amplifier for amplifying an optical DWDM data signal received at the first port over the first optical fiber and to be transmitted at the second port via the second optical fiber; a first optical filter for separating the optical DWDM data signal from a combined signal comprising a reference frequency and timing signal and an OSC signal, and forwarding the separated optical DWDM data signal to the optical amplifier; a second optical filter for combining the amplified optical DWDM data signal and the combined signal, and forwarding the combination of these signals to the second port; and a further optical amplifier for amplifying the separated reference frequency and timing signal. Such amplification system enables the amplification of optical data in an optical data signal as well as amplification of a reference frequency and timing signal. The use of a reference frequency and timing signal may improve the synchronization accuracy in a DWDM transmission network. The addition of the further optical amplifier can be executed without interruption of data traffic.

Some embodiments of the invention relate to a transmission system for distributing reference frequency and timing information in a network, in particular a Dense Wavelength Division Multiplexed, DWDM, network, the transmission system comprising: a transmitter as described above; a receiver as described above; an optical fiber for connecting the transmitter and the receiver; and a remote frequency and timing unit for providing frequency and timing information to the receiver.

Finally, some embodiments of the invention relate to a method for distributing reference frequency and timing information in a network, in particular a Dense Wavelength Division Multiplexed, DWDM, network, comprising an optical data transmitting node and an optical data receiving node, the method comprising: generating a reference frequency and timing signal in the optical data receiving node; combining the reference frequency and timing signal with the optical data signal so as to form a combined signal; transmitting the combined signal to the optical data receiving node; separating the reference frequency and timing signal and the optical data signal in the optical data receiving node; processing the reference frequency and timing signal and generating an optical return timing signal in response; transmitting the optical return timing signal to the optical data transmitting node; processing the optical return timing signal, determining latency information regarding the latency of data transfer between the optical data transmitting node and the optical data receiving node, and generating an updated reference frequency and timing signal including the latency information; and transmitting the updated reference frequency and timing signal to the optical data receiving node Exemplary embodiments of the present invention will now be described in detail with reference to the accompanying drawings. The invention may, however, be embodied in many different forms and should not be construed as being limited to the embodiments set forth herein. It is noted that shapes and sizes of elements in the drawings may be exaggerated for clarity.

Throughout the description certain expressions refer to the following. The expression "frequency" refers to the number of cycles per second of a periodic signal. The expression "time" refers to the total number of cycles that have passed since a certain reference point in time. In other words, the "time" may be looked at as the total accumulated phase of the periodic signal since the reference point in time. The expression "clock" refers to a device which keeps time by counting the number of cycles of a local periodic signal generated by a device, generally denoted by local oscillator (LO).

The expression "synchronization" refers to the adjustment of a number of N (N>1) clocks so that their respective reference points in time correspond to the same time instant. Synchronization may be achieved in two steps. In the first step a "timing" signal is transmitted by a first clock, followed by detection of this timing signal by a second clock. The detection may be based on the shape of the timing signal, which generally includes a portion with a steep slope that is easy to detect. Upon detection the cycle counter in the second clock is triggered. The second step consists of correcting the offset of the second clock's counter for the propagation delay experienced by the timing signal during transmission, further referred to as "latency". The information regarding latency is preferably measured and then the latency information obtained by the measurement is transferred to the second clock. The two steps together achieve synchronization of two clocks and do not necessarily need to be executed in the order given above.

Finally, the expression "synthonisation" (more usually written as "syntonisation") refers to the action that forces the oscillators of N clocks to cycle at the same frequencies, so that clock drifts between different clocks are minimized after synchronization. Efficient syntonisation and prolonged synchronization may be achieved by disseminating a "reference frequency" of high accuracy and spectral purity to multiple clocks.

Figure 1:
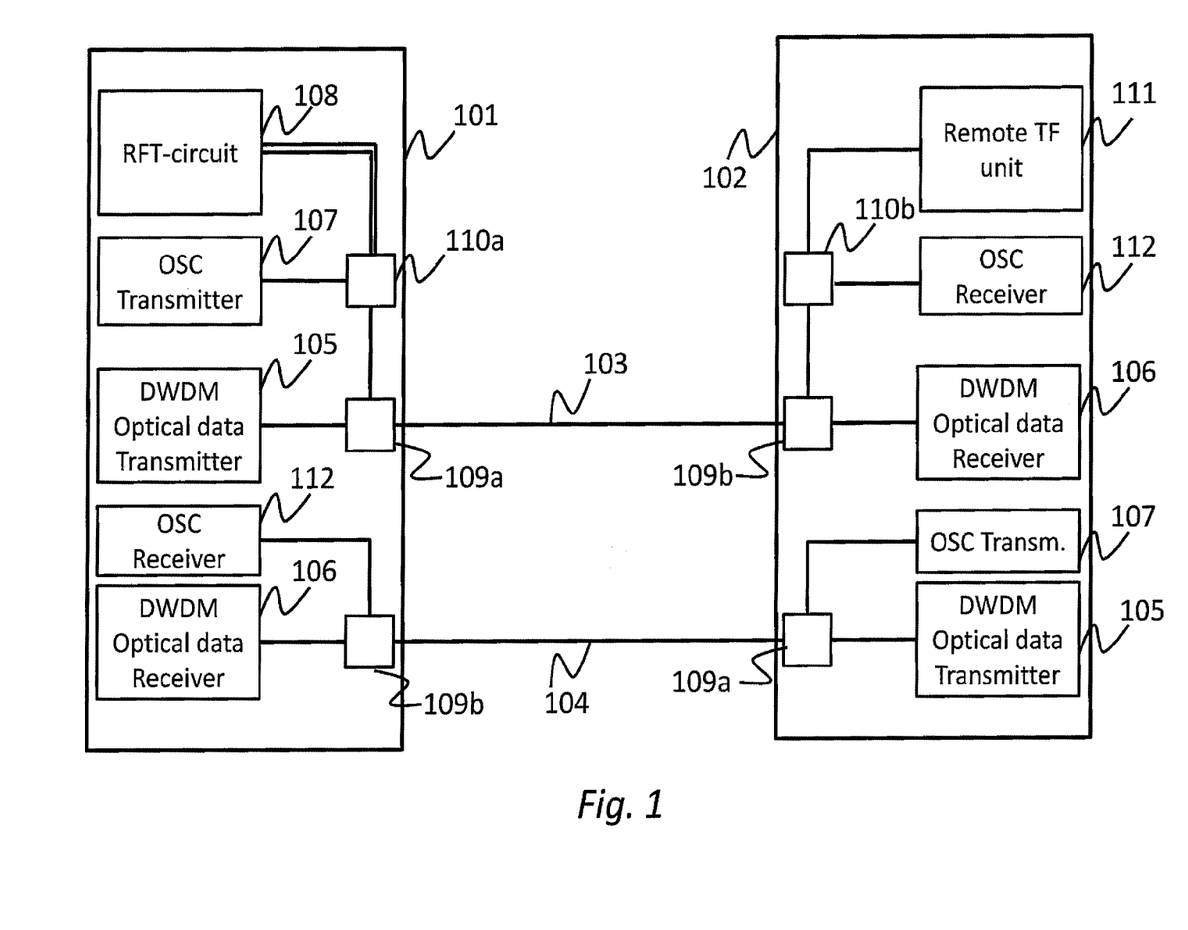
FIG. 1 is a block diagram illustrating a system for time and frequency distribution and synchronization according to an embodiment of the present invention.

FIG. 1 schematically depicts an optical transmission system for providing synchronization and frequency dissemination. The optical transmission system includes a local node 101 for providing an optical timing and frequency reference to one or more remote nodes 102. In the embodiment shown in FIG. 1, local node 101 and remote node 102 are communicatively coupled by using an optical fiber pair comprising optical fiber 103 and optical fiber 104. Optical fiber 103 is configured to arrange the transfer of data from local node 101 to remote node 102. Optical fiber 104 is configured to arrange the transfer of data from remote node 102 to local node 101. Note that at least optical fiber 103, in some embodiments also fiber 104, can transmit data in both directions to achieve the desired data transfer. Throughout the description the local node 101 is used as an optical data transmitting node, whereas the remote node 102 is used as an optical data receiving node.

Local node 101 comprises an optical data transmitter 105 for transmitting optical data via the optical fiber 103 to remote node 102. The optical data transmitter 105 comprises one or more optical transmitters, each transmitter arranged for transmitting data over a different wavelength. In particular, as shown in FIG. 1, the optical data transmitter 105 may be configured as a DWDM (Dense Wavelength Division Multiplexed) comprising a plurality of transmitters, typically arranged for transmitting data over a wavelength between about 1525 and about 1565 nm.

Remote node 102 comprises an optical data receiver 106 comprising one or more optical receivers for receiving optical data from the transmitter 105. Typically the number and wavelength handling capability of the receivers corresponds to the number and wavelength handling capability of the transmitters within the optical data transmitter 105 in the local node 101. For example, in case of DWDM, the receiver may comprise a plurality of receivers arranged for receiving data over a wavelength between about 1525 and about 1565 nm.

Local node 101 further comprises an OSC (Optical Supervisory Channel) transmitter 107, and an optical filter 109a. An exemplary operation of these elements in the local node 101 is as follows.

The OSC transmitter 107 is arranged for transmitting an optical supervisory signal comprising management and alarming information. The supervisory signal, hereafter referred to as OSC-signal, is an optical signal that is transmitted over a wavelength preferably different from a wavelength within the wavelength range used for the transmission of the optical data. For example, the OSC signal may use a wavelength in a range of about 1504 nm to about 1518 nm, e.g. 1510 nm. This wavelength is standardized by the International Telecommunication Union (ITU), and used in commercially available DWDM transmission systems.

The optical filter 109a is arranged for combining signals that are to be transmitted from the local node 101 to the remote node 102 via optical fiber 103. The filter 109a thus combines the optical OSC signal from the OSC transmitter 107 and the optical data transmitted from the DWDM transmitter 105.

The local node 101 further comprises a reference frequency and timing circuit 108. The reference frequency and timing circuit 108, hereafter referred to as RFT-circuit 108, is arranged for generating an optical reference frequency and timing signal with high accuracy. The reference frequency may correspond to the clock frequency used within the local node 101. The reference time is an absolute time. For example, the reference time may correspond to Coordinated Universal Time (UTC). The reference frequency and timing signal may further include latency information which accounts for the latency of signals transmitted between the local node 101 and the remote node 102. Further details regarding the determining of the latency will be described later. The signal generated by the RFT-circuit 108 is generally transmitted as an optical signal, where the optical signal is transmitted over a wavelength that is different from any of the other wavelengths used within the local node. For example, a suitable wavelength of the optical signal may be in a range of about 1484 nm to about 1498 nm, e.g. about 1490 nm. Such wavelength lies within the standardized grid for CWDM (Coarse Wavelength Division Multiplex) transmission systems. As a result costs may be limited, since cost-effective lasers operating at a wavelength of about 1490 nm may be used.

Finally, the local node 101 in FIG. 1 comprises a further optical filter 110a. The optical filter 110a is arranged for combining the optical frequency and timing signal from the circuit 108 and the OSC signal from the OSC transmitter 107. The combined signal may then be provided to optical filter 109a which is arranged for combining the combined signal from optical filter 110a with the optical data from DWDM optical data transmitter 105. The output of the optical filter is then provided to optical fiber 103 for transmission to remote node 102.

The optical filters 109a and 110a are bidirectional filters, i.e. they can handle with signals running through them in different directions. In a first direction, the filters combine signals of different origin and forward the combined signal over a single line towards a further destination. In a second direction, opposite to the first direction, combined signals are received and separated, and the separated signals are forwarded to their respective destinations. In some embodiments, such bidirectional filters are configured to transfer signals having a first wavelength in one direction, while the signals running in an opposite direction through the filter are transferred using a second wavelength different from the first wavelength. Throughout this specification, a filter that is used on a transmission end of the signal transfer between nodes will be denoted with an extension "a", while a filter used on a receiving end of the signal transfer between nodes will be denoted with an extension "b".

Remote node 102 also comprises optical filters 109, 110. The optical filter 109b of remote node 102 is arranged for receiving the signals from local node 101 via optical fiber 103 and for separating the OSC signal and the optical frequency and timing signal from the DWDM optical data. The OSC signal and the optical frequency and timing signal may then be provided to an optical filter 110b. The optical filter 110b is arranged for separating the OSC signal from the optical frequency and timing signal. After separation, the filter 110b provides the OSC signal to OSC receiver unit 112 and provides the optical frequency and timing signal to remote timing and frequency unit 111, respectively.

The remote TF unit 111 comprises circuitry arranged for retrieving an electrical frequency and timing signal from the optical frequency and timing signal generated by RFT-circuit 108 in the local node 101. The remote timing and frequency unit 111 in remote node 102 may comprise a loopback circuit arranged for retrieving the timing signal from the optical frequency and timing signal and optically transmitting it back as an optical return timing signal to RFT-circuit 108 in local node 101 via fiber 103. The optical return timing signal may use yet another wavelength than any of the wavelengths described above, for example the optical return timing signal may use a wavelength in a range of about 1465 nm to about 1478 nm, e.g. about 1470 nm.

The optical RFT-circuit 108 comprises a circuit arranged for receiving and processing the optical return timing signal from the remote TF unit 111. The RFT-circuit determines the time period that has elapsed between sending an optical frequency and timing signal and receiving the optical return timing signal. The latency of the signal transfer then equals the corrected time period divided by two. Because the latency is measured on one and the same optical fiber, i.e. fiber 103, slow length variations in the fiber due to for example temperature and vibrations can be taken in to account. Using this technique, the absolute time in the remote TF unit 111 in the remote node 102 can be determined with an accuracy down to about 10 ns, which is a considerable improvement compared to the accuracy that can at present be achieved in SDH/SONET or GPS timing packet-based mobile network. The RFT-circuit 108 includes the determined latency of optical fiber 103 in the next optical reference frequency and timing signal that is transmitted to remote node 102 over optical fiber 103. Based on the absolute time information in combination with the determined latency, the remote node 102 is now able to provide the optical data received by the DWDM-receiver 106 with an accurate timing label, e.g. the time of the day, for example in the form of a time stamp.

The addition of one or more components 108, 110a, and 110b can be executed in-service, i.e. without interruption of optical data traffic. Consequently, the timing and frequency signal can be added to an existing DWDM transmission system without substantially affecting its performance. The addition of one or more filters 110a, 110b may merely cause a small additional power loss on the channel carrying the OSC-signal, also referred to as OSC-channel. However, such loss can be easily bridged by the OSC transmitter since the OSC-channel usually transfers the OSC-signal at a much lower bit rate than the bit rate used in the channels carrying the optical data transmitted by the DWDM-transmitter 105, and therefore has a larger loss budget.

In some embodiments, the remote timing and frequency unit 111 comprises a photo detector. The photo detector is arranged to convert the received optical frequency and timing signal to an electrical signal. In such embodiments a clock recovery circuit may be arranged within the remote unit 111 to retrieve an electrical frequency signal with high accuracy from the electrical signal.

As shown in FIG. 1, the local node 101 further comprises a DWDM optical data receiver 106, an OSC receiver 112 and an optical filter 109b. Similarly, the remote node 102 further comprises a DWDM optical data transmitter 105, an OSC transmitter 107 and an optical filter 109a. The optical filter 109a within remote node 102 and the optical filter 109b within the local node 101 are connected to each other via a fiber 104. The components 105, 107 and 109a within remote node 102 and the components 106, 112 and 109b within local node 101 are used for data transmission from the remote node 102 towards the local node 101.

Preferably, the DWDM transmission system uses the C-band for the data channel wavelengths. The C-band typically uses wavelengths between about 1525 and about 1565 nm. The different data channels may be, for example, 10 Gb/s, 40 Gb/s and 100 Gb/s channels. The modulation formats that may be used include but are not limited to NRZ (Non-Return-to-Zero), RZ (Return-to-Zero), CSRZ (Carrier-Suppressed Return to Zero), PM-QPSK (Polarization Multiplexed Quadrature Phase Shift Keying), DPSK (Differential Phase Shift Keying) or DQPSK (Differential Quadrature Phase Shift Keying).

As already mentioned above, the OSC signal may use a wavelength in a range of about 1504 to about 1518 nm, for example about 1510 nm. This wavelength is standardized by the ITU, and used in commercially available DWDM transmission systems. Additionally, the optical frequency and timing signal typically uses a wavelength below 1500 nm, in particular a wavelength in a range of about 1484 nm to about 1498 nm, such as about 1490 nm. Such wavelength lies within the standardized grid for CWDM (Coarse Wavelength Division Multiplex) transmission systems. As a result, costs may be limited, because low-cost components, such as cost-effective lasers operating at a wavelength of about 1490 nm may be used.

The use of these wavelengths for the optical OSC-signal and the optical reference frequency and timing signal enables the use of optical edge filters for optical filters 109 and 110. The use of optical edge filters alleviates the complexity of the system.

In case an optical return timing signal is used, such optical return timing signal preferably uses yet another wavelength, for example a wavelength in a range of about 1465 nm to about 1478 nm, such as about 1470 nm. In such case, optical filter 110a within the local node 101 is not only capable of combining the reference frequency and timing signal using a first wavelength with the OSC signal using a second wavelength, and forwarding these signals in a combined form towards the remote node 102. In addition, the filter 110a is arranged for receiving the optical return timing signal using a third wavelength and forwarding the optical return timing signal towards the RFT-circuit 108. Similarly, optical filter 109a is capable of combining the combination of the OSC-signal and the reference frequency and timing signal with the optical data sent by the DWDM-transmitter 105, as well as arranged for receiving the optical return timing signal and forwarding this signal towards optical filter 110a.

The exemplary wavelength given for the OSC-signal above is particularly suitable for DWDM-systems using C-band transmission for optical data. However, in some countries, e.g. Japan, the so-called L-band is used, where the typical optical data transfer wavelength lies between about 1565 nm and about 1625 nm. In such case, the OSC-signal wavelength is preferably longer than the wavelength of the DWDM-signal, e.g. about 1630 nm. The use of a longer OSC-signal wavelength enables in particular the implementation into DWDM systems using DSF (Dispersion Shifted Fiber) or ITU-T G.653 fiber which is the vast majority of installed fibers in Japan. In this case the frequency and timing and the optical return timing signal should have longer wavelength if compared to 1630 nm, for example about 1635 nm and 1640 nm. These wavelengths should not be too long to avoid excess loss in the fiber due to increased bending loss at long wavelengths.

Figure 2:
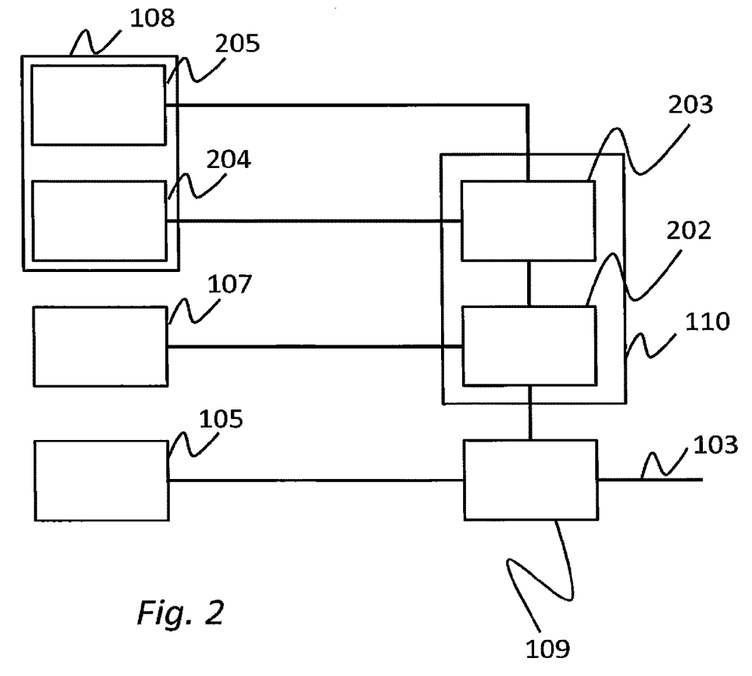
FIG. 2 is a block diagram illustrating an embodiment of a transmitting portion of a local node that may be used in the system of FIG. 1.

FIG. 2 shows an embodiment of a transmitting portion of a local node in more detail. In this embodiment, the optical filter 110 comprises two concatenated sub-filters 202, 203. The optical sub-filters 202 and 203 are bi-directional. Furthermore, RFT-circuit 108 comprises a receiver 204 and a transmitter 205.

The first optical sub-filter 202 is arranged for functioning in a similar way as filter 110a in the embodiment shown in FIG. 1. However, instead of receiving the reference frequency and timing signal directly from the RFT-circuit 108, first sub-filter 202 receives this signal from the second optical sub-filter 203. Similarly, the return timing signal is not directly forwarded towards the RFT-circuit 108, but is forwarded towards the second sub-filter 203.

The second optical sub-filter 203 is arranged for receiving the reference frequency and timing signal from the transmitter 205 in the RFT-circuit 108, and forwarding this signal to the first optical sub-filter 202. The second optical sub-filter 203 is further arranged for receiving the optical return timing signal from the first optical sub-filter 202, and forwarding this signal to the optical receiver 204 within RFT-circuit 118.

The RFT-circuit 108 may further comprise a converter for converting the optical signal received by the receiver 204 into an electrical signal, a processor for processing this signal such that the measured latency can be included in a frequency and timing signal. Generally, the signal is an electrical signal, and therefore the transmitter 205 in RFT-circuit 108 may include a further converter for converting an electrical frequency and timing signal into an optical frequency and timing signal, which may include the measured latency. All these functions may be integrated in receiver 204, which in such case could take the form of a transceiver 204. The conversion of the electrical frequency and timing signal within the RFT-circuit may be executed including the use of NRZ (Non-Return-to-Zero) which is a cost-effective modulation format. The conversion may also be executed using DPSK (Differential Phase Shift Keying). An advantage of DPSK is that it comprises less AM (Amplitude Modulation). In some embodiments, the transceiver for converting an electrical signal into an optical signal may be an SFP-transceiver (Small Form factor Pluggable, see http://www.sffcommittee.com/ie/Specifications.html). Preferably, the receiver 204 is arranged for receiving signals at a first wavelength, e.g. an optical return timing signal at a wavelength of about 1470 nm, and the transmitter 205 is arranged for transmitting signals at a second wavelength, e.g. a frequency and timing signal at a wavelength of about 1490 nm.

In some embodiments the remote TF unit 111 comprises an SFP for receiving the optical frequency and timing signal from reference circuit 108, retrieving an electrical frequency and timing signal from the received optical signal, and for providing the electrical signal to an optical transmitter arranged for converting the electrical signal into an optical return timing signal that is transmitted back to the local node 101 for measuring the latency of fiber 103.

In some embodiments, the SFP in the remote TF unit 111 is complementary to the SFP in circuit 108. In such case, the SFP of the circuit 108 is arranged to receive signals at a first wavelength and to transmit signals at a second wavelength, while the complementary SFP within the remote unit 111 is arranged to receive signals at the second wavelength and to transmit return signals at the first wavelength.

Figure 3:
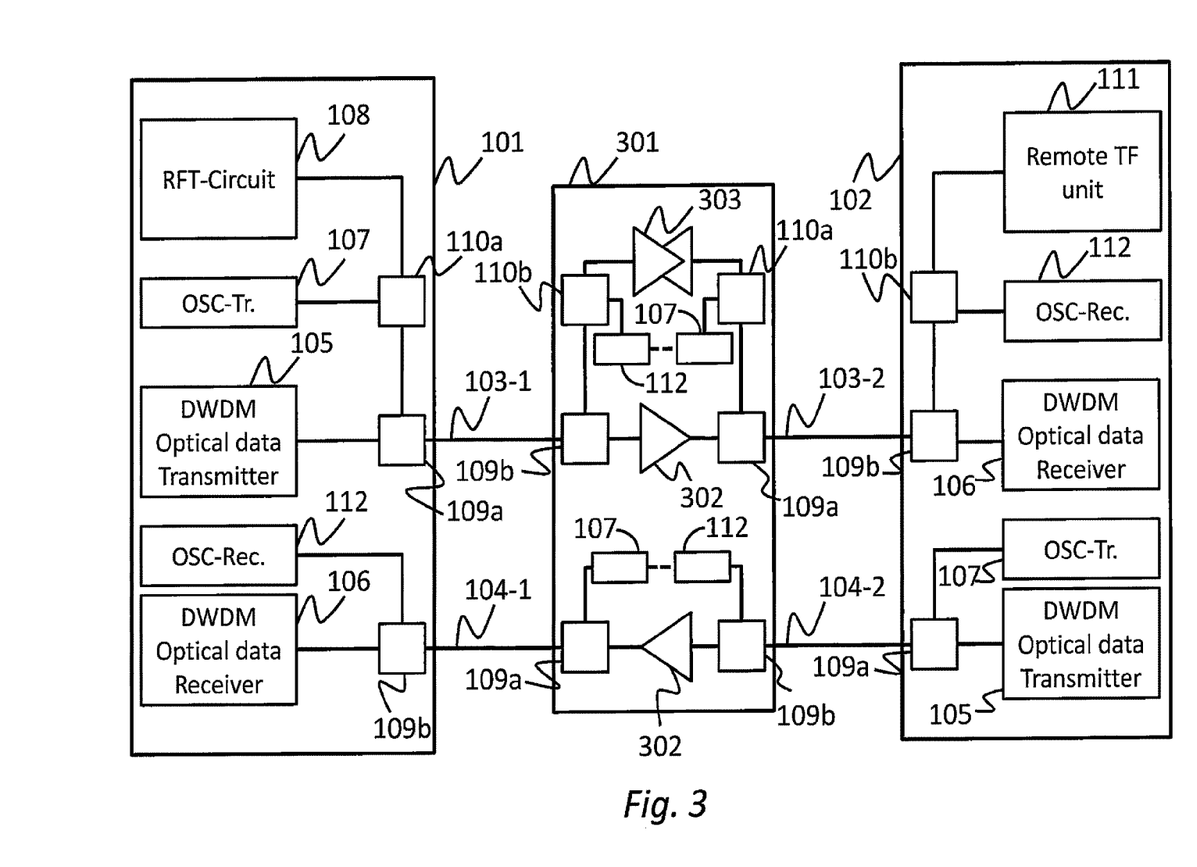
FIG. 3 is a block diagram illustrating a system for time and frequency distribution and synchronization including a bypass amplifier.

FIG. 3 is a block diagram illustrating a system for time and frequency distribution and synchronization including an optical amplifier system 301. The optical amplifier system 301 is included between a first fiber pair 103-1 104-1 and a second fiber pair 103-2, 104-2 between the local node 101 and the remote node 102. The optical amplifier system 301 is arranged for compensating the loss of the first fiber pair 103-1, 104-1, between local node 101 and bypass amplifier system 301.

The optical filter 109b connected to fiber 103-1 is arranged for receiving the plurality of signals at the output of optical fiber 103-1 and for separating the DWDM signals from the OSC signal and the optical frequency and timing signal. The DWDM signals are then provided to optical amplifier 302 arranged for amplifying the DWDM signals. Optical filter 109b is further arranged for providing the OSC wavelength and the optical frequency and timing signal to optical filter 110b within the amplifier system 301.

The optical amplifier system 301 further includes a further optical amplifier 303 for amplifying the optical frequency and timing signal, and providing the amplified signal to optical filter 110a in amplifier system 301. The advantage of using filters 110b, 110a in combination with an amplifier 303 in the trajectory between circuit 108 and remote unit 111 is that the timing and frequency signal can be added to an existing DWDM transmission system without affecting its performance. The addition of one or more components 108, 110a, 110b and 303 can be executed in-service, i.e. without interruption of data traffic. Furthermore, although the addition of one or more filters 110a, 110b may cause a small additional power loss on the OSC channel, such loss can be easily bridged by the OSC transmitter since the OSC channel usually transfers data at a much lower bitrate than the bit rate used in the data channels.

Typically, the optical amplifier 302 is a so-called EDFA (Erbium Doped Fiber Amplifier), which is capable of amplifying the optical data signals originating from DWDM-transmitter 105, but is incapable of amplifying typical wavelengths used for purpose of this invention, e.g. the wavelengths used for the reference frequency and timing signal and the optical return timing signal. Therefore, the further optical amplifier is a different type of amplifier than optical amplifier 302.

Preferably, the optical the optical amplifier 303 is a bi-directional amplifier. Such a bi-directional amplifier is not only arranged for amplifying the optical frequency and timing signal, in the transmission direction from the local node 101 to the remote node 102, but also for amplifying the optical return timing signal, in the opposite transmission direction from the remote node 102 to the local node 101. The amplified optical frequency and timing signal is then provided to optical filter 110a, whereas the amplified optical return signal is provided to optical filter 110b in amplifier system 301. As a result, the optical frequency and timing signal and the optical return timing signal use the same optical path between local node 101 and remote node 102. The relatively short round trip time of these optical signals (due to the large speed of light), if compared to the relatively long timescale of the variations of the optical path length (due to, for example, vibrations and temperature) make the latency measurement very accurate. As a result, the absolute time in the remote TF unit 111 in the remote node 102 can be determined very accurately, typically with an accuracy down to about 10 ns.

A suitable amplifier for the further optical amplifier 303 in the amplifier system 301 would be an SOA (Semi-conductor Optical Amplifier). This type of amplifier is arranged for amplifying typical wavelengths presented above, for example wavelengths of about 1470 nm and about 1490 nm. In embodiments where circuit 108 comprises a transmitter 205 and a receiver 204 or a transceiver using DPSK, the transient behaviour of the SOA is reduced as a result of the relatively low amplitude modulation that is present in the reference frequency and timing signal.

Although an embodiment has been shown wherein a further optical amplifier 302 is used to amplify the optical frequency and timing signal, in an alternative embodiment this further optical amplifier may be replaced by a passive optical connection, so that the optical frequency and timing signal may be passed without amplification.

In some embodiments, the further optical amplifier 303 may comprise two further identical amplifiers placed in parallel to each other, each placed in series with an optical isolator and a transmission filter which transmits only one of the typical wavelengths. In an example, the first of the two further amplifiers transmits only wavelengths of about 1490 nm travelling exclusively in the direction from the RFT-circuit 108 to the remote time and frequency unit 111, while the second of the two further amplifiers transmits only wavelengths of about 1470 nm travelling exclusively in the direction from remote time and frequency unit 111 to the RFT-circuit 108. This arrangement has the advantage that cross talk, due to the transient behaviour of the SOA, between the data streams at the two different wavelengths is avoided. In addition, using such an arrangement amplitude-modulation (AM) signal formats may be employed for the exchange of frequency and time signals. In some embodiments, such AM signals may be generated by low-cost SFP transceivers.

In an embodiment, the timing signal may be a digital optical OOK (On off keying) signal with frames comprising a timestamp. In a further advantageous embodiment it may be a phasemodulated optical digital signal, e.g. a differential phase shift keying DPSK signal or a differential quaternary phase shift keying DQPSK signal, with frames and a timestamp and which comprises less intensity transitions if compared to OOK which decreases the negative impact of transient gain in a SOA (Semiconductor Optical Amplifier) on the performance of the timing distribution if a SOA is used for the bidirectional amplifier 303.

As will be apparent from the preceding description, as used herein optical filters are devices that selectively direct light from a filter wavelength range from an input to an output. In particular, filters with one input and more than one (e.g. two) outputs may be used, or more than one input and one output, wherein light from different filter wavelength ranges at the input are directed to different outputs respectively, or light from different filter wavelength ranges at different inputs are directed to the same output. These optical filters may be bidirectional in the sense that a filter that directs light from different filter wavelength ranges at the input to different outputs respectively, also works in the other direction to direct light from different filter wavelength ranges at different outputs to the input. Commercially available filters such as the 1510/1550 and 1550/1625 filter wavelength division multiplexers from JDSU may be used for example. These use thin film filter based interference filters to add a supervisory channel for active fiber monitoring. A filter may in fact comprise a combination of elements that are filters themselves.

Although examples have been described wherein the functions of splitting and wavelength selective filtering have been combined in the filters. It should be appreciated that in certain embodiments these functions may be performed by different components. For example the OSC receiver, the reference frequency and timing circuit 108 of node 100 and/or reference frequency and timing circuit 108 of node 101 may transmit or receive optical signals via a splitter and a filter with a single input and output. In another embodiment, the reference frequency and timing signal and the OSC signal may be combined electronically and the combined electronic signal may be used to generate an optical signal. Similarly, the reference frequency and timing signal and the OSC signal may be optically detected in combination and split electronically. However, this involves modification of existing OSC transmitters or receivers. Use of optical filtering makes it possible to use existing OSC transmitters or receivers.

As described, method is provide for distributing reference frequency and timing information in a network with pairs of first and second optical fibers in optical fiber connections between network nodes, for transmission of optical data signals separately in mutually opposite directions between the network nodes respectively, the method comprising:
  generating a reference frequency and timing signal in a first node (101) of the network;
  optically combining the reference frequency and timing signal with a first optical data signal so as to form a combined optical signal for transmission from the first node (101) to a second node of the network;
  transmitting the combined optical signal to the second node (102) via a first optical fiber (103) of an optical fiber connection with a pair of optical fibers between the first node (101) and the second node (102);
  separating the reference frequency and timing signal and the first optical data signal in the second node (102);
  processing the reference frequency and timing signal and generating an optical return timing signal in response;
  transmitting the optical return timing signal from the second node to the first node via the first optical fiber (103);
  receiving the optical return signal at the first node (101);
  processing the received optical return timing signal, determining latency information regarding the latency of data transfer between the first node and the second node.

Although such embodiments have been described wherein the optical reference frequency and timing signal is transmitted via the first fiber that is also used to transmit the optical data signal from the node that generates the reference frequency and timing signal, it should be appreciated that the roles of the fibers may be interchanged in this respect. In another embodiment, the optical reference frequency and timing signal is transmitted from the first node via the second fiber, which is used to receive the optical data signal at the first node. In this embodiment, the optical return signal is also returned from the second node via the second fiber, optionally via optical filters that are used to transmit an OSC signal from the second node via the second node. In this way equal delays for upstream and downstream transmission can be ensured.

As used herein, the language stating that a first element is "coupled" to a second element does not exclude that the first element is coupled to the second element via one or more other elements. In particular an coupling between elements that exchange signals may include one or more other elements that pass these signals.

The reference frequency and time may be derived from a clock external to local node 101. The RFT-circuit may therefore be arranged for receiving and processing an external frequency and time signal, and converting it to an optical reference frequency and timing signal. RFT-circuit 108 may comprise an external clock input channel 206 for this purpose. The RFT-circuit may comprise a converter circuit for converting the external clock signal, received through the external clock input channel, to the optical frequency and time signal to be transmitted by transmitter 205. Alternatively, the RFT-circuit 108 may use the clock of local node 101 as a time and frequency reference.

In an embodiment, information may be added to the optical return timing signal in the remote timing and frequency unit 111 to represent a known intrinsic delay which may occur between receiving the optical frequency and timing signal and transmitting the optical return timing signal. Usually, this delay will be small. Furthermore, information about a known intrinsic wavelength-dependent difference in propagation delay of the optical frequency and time signal and the optical return timing signal may be added in the remote timing and frequency unit 111 to the optical return timing signal.

The RFT-circuit may correct this time period for small and known intrinsic delays as retrieved from the optical return timing signal transmitted by the remote timing and frequency unit 111.

Although examples of wavelength ranges have been provided for use in C-band DWDM systems with data transmission in the wavelength range of about 1530-1565 nm and OSC at 1510 nm, it should be appreciated that other wavelengths may be used. For example, in some countries known L-band DWDM systems are used, with data transmission in a wavelength range of 1570-1610 nm and an OSC wavelength of 1625 nm. In this case the wavelengths described in the preceding may be changed accordingly. An optical filter (110*a*) is provided for use in a transmitter in a Dense Wavelength Division Multiplexed, DWDM, transmission system, the optical filter comprising:
  a first port for communicative coupling to a reference frequency and timing circuit (108);
  a second port for communicative coupling to an optical supervisory channel, OSC, transmitter unit (107); and
  a third port for communicative coupling to a further optical filter (109*a*) arranged for enabling transmission of DWDM optical data over an optical fiber (103);
wherein the optical filter (110*a*) is arranged for:
  receiving a reference frequency and timing signal via the first port;
  receiving an OSC signal via the second port;
  combining the frequency and timing reference signal and the OSC signal so as to form a combined signal;
  transmitting the combined signal towards the further optical filter via the third port.

In an embodiment the reference frequency and timing signal has a wavelength in a range of about 1484 to about 1498 nm. In an embodiment the OSC signal has a wavelength in a range of about 1504 to about 1518 nm. In an embodiment the DWDM optical data are transferred using a plurality of wavelengths within a wavelength range from about 1525 to about 1565 nm.

In an embodiment the filter may be further arranged for:
receiving an optical return timing signal via the third port; and
forwarding the optical return timing signal towards the reference frequency and timing circuit via the first port. In a further embodiment the optical return timing signal has a wavelength in a range of about 1465 nm to about 1478 nm. In an embodiment the filter of claim further comprises a fourth port for a further communicative coupling to the reference frequency and timing circuit (108), and wherein said forwarding of the optical return timing signal towards the reference frequency and timing circuit is performed via the fourth port.

According to another aspect a transmitter for use in a Dense Wavelength Division Multiplexed, DWDM, transmission system is provided, the transmitter comprising:
a reference frequency and timing circuit (108) for generating a reference frequency and timing signal;
an optical supervisory channel, OSC, transmitter unit (107) for generating an OSC signal;
an optical filter (110a) according to any one of the preceding claims for combining the reference frequency and timing signal and the OSC signal so as to form a combined signal;
a DWDM optical data transmission unit for generating a signal comprising DWDM optical data; and
a further optical filter (109a) for combining the signal DWDM optical data comprising signal and the combined signal.

In an embodiment the transmitter further comprises an output arranged for connection to an optical fiber (103). In an embodiment the reference frequency and timing circuit (108) comprises an optical transceiver for converting an electrical frequency and timing signal into an optical frequency and timing signal. In an embodiment the transceiver comprises a small form factor pluggable, SFP, transceiver. In an embodiment the optical filter is an optical filter according as described in the preceding, wherein the reference frequency and timing circuit is arranged for:
receiving the optical return timing signal;
determining the latency of the transmission medium between the transmitter and a predetermined destination;
adding latency information in the reference frequency and timing signal; and
sending the reference frequency and timing signal including the latency information towards the predetermined destination.

In an embodiment the optical filter (110) comprises a first optical sub-filter (203) and a second optical sub-filter (202), wherein the first optical sub-filter is arranged for:
receiving the optical return timing signal from the second optical sub-filter and forwarding the optical return timing signal to the reference frequency and timing circuit, and
receiving the reference frequency and timing signal from the reference frequency and timing circuit and forwarding the reference frequency and timing signal to the second optical sub-filter; and
wherein the second optical sub-filter is arranged for combining the OSC signal and the reference frequency and timing signal.

According to another aspect an optical filter (110b) for use in a receiver in a Dense Wavelength Division Multiplexed, DWDM, transmission system is provided, the optical filter comprising:
a first port for communicative coupling to a reference frequency and timing circuit (111);
a second port for communicative coupling to an optical supervisory channel, OSC, receiver unit (112); and
a third port for communicative coupling to a further optical filter (109b) arranged for enabling transmission of DWDM optical data over an optical fiber (103);
wherein the optical filter (110b) is arranged for
receiving a combined signal from the further optical filter via the third port;
separating the combined signal into a reference frequency and timing signal and an OSC signal;
transmitting the reference frequency and timing signal to the reference frequency and timing circuit via the first port; and
transmitting the OSC signal to the OSC unit via the second port.

In an embodiment the reference frequency and timing signal has a wavelength in a range of about 1484 to about 1498 nm. In an embodiment the OSC signal has a wavelength in a range of about 1504 to about 1518 nm. In an embodiment the DWDM optical data are transferred using a plurality of wavelengths within a wavelength range from about 1525 to about 1565 nm. In an embodiment the filter (110b) is further arranged for:
receiving an optical return timing signal via the first port; and
forwarding the optical return timing signal towards the further optical filter via the third port. In an embodiment the optical return timing signal has a wavelength in a range of about 1465 nm to about 1478 nm.

According to another aspect a receiver for use in a Dense Wavelength Division Multiplexed, DWDM, transmission system is provided, the receiver comprising:
an optical frequency and timing retrieving unit arranged for communication with a remote timing and frequency unit circuit (111) for retrieving a frequency and timing reference signal;
an optical supervisory channel, OSC, receiver unit (107) for receiving an OSC signal;
a DWDM optical data receiving unit for processing a signal comprising DWDM optical data;
an optical filter (109b) for separating an optical DWDM data signal from a combined signal comprising a reference frequency and timing signal and an OSC signal, and forwarding the separated optical DWDM data signal to the DWDM optical data receiving unit; and
a further optical filter (110b) according to any one of claims 14-19 for separating the reference frequency and timing signal from the OSC signal, and for transmitting the reference frequency and timing signal to the optical frequency and timing retrieving unit, and for transmitting the OSC-signal to the OSC receiver unit. In an embodiment the receiver further comprises an input arranged for connection to an optical fiber. In an embodiment the receiver further comprises an optical transceiver for converting an electrical return timing signal received from the remote timing and frequency unit circuit into an optical return timing signal, wherein the receiver is further arranged to forward the optical return timing signal towards the optical fiber via the input. In an embodiment the transceiver comprises a small form factor pluggable, SFP, transceiver.

According to another aspect an amplifier system (301) for time and frequency distribution in a Dense Wavelength Division Multiplexed, DWDM, network is provided, the system comprising:
  a first port for connection to a first optical fiber (103-1);
  a second port for connection to a second optical fiber (103-2);
  an optical amplifier (302) for amplifying an optical DWDM data signal received at the first port over the first optical fiber and to be transmitted at the second port via the second optical fiber;
  a first optical filter (109b) for separating the optical DWDM data signal from a combined signal comprising a reference frequency and timing signal and an optical supervisory channel, OSC, signal, and forwarding the separated optical DWDM data signal to the optical amplifier;
  a second optical filter (109a) for combining the amplified optical DWDM data signal and the combined signal, and forwarding the combination of these signals to the second port; and
  a further optical amplifier (303) for amplifying the separated reference frequency and timing signal. In an embodiment the reference frequency and timing signal has a wavelength in a range of about 1484 to about 1498 nm. In an embodiment the DWDM optical data are transferred using a plurality of wavelengths within a wavelength range from about 1525 to about 1565 nm. In an embodiment the amplifier system further comprises:
  a third optical filter (110b) for separating the reference frequency and timing signal from the OSC signal, and for transmitting the reference frequency and timing signal to the further optical amplifier;
  a fourth optical filter (110a) for combining the amplified reference frequency and timing signal and the OSC signal so as to form the combined signal. In an embodiment the OSC signal has a wavelength in a range of about 1504 to about 1518 nm. In an embodiment the further optical amplifier is a semiconductor optical amplifier. In an embodiment the system is further arranged for
  receiving an optical return timing signal via the second port;
  forwarding the optical return timing signal towards the second port via at least the second optical filter and the first optical filter; and
  transmitting the optical return timing signal via the first port. In an embodiment the optical return timing signal has a wavelength in a range of about 1465 nm to about 1478 nm.

According to another aspect a transmission system for distributing reference frequency and timing information in a network, in particular a Dense Wavelength Division Multiplexed, DWDM, network is provided, the transmission system comprising:
  a transmitter according to any one of claims 6-9;
  a receiver according to any one of claims 13-15;
  an optical fiber (103) for connecting the transmitter and the receiver; and
  a remote frequency and timing unit (111) for providing frequency and timing information to the receiver.
In an embodiment, the remote frequency and timing unit in this transmission system comprises a loopback circuit for retrieving a timing signal from the optical frequency and timing signal and optically transmitting said retrieved timing signal back as an optical return timing signal to the optical frequency and timing circuit in the transmitter via the optical fiber.

In an embodiment, the transmission system, further comprises an amplifier system.

According to another aspect a method for distributing reference frequency and timing information in a network, in particular a Dense Wavelength Division Multiplexed, DWDM, network is provided, comprising an optical data transmitting node and an optical data receiving node, the method comprising:
  generating a reference frequency and timing signal in the optical data receiving node;
  combining the reference frequency and timing signal with the optical data signal so as to
form a combined signal;
  transmitting the combined signal to the optical data receiving node;
  separating the reference frequency and timing signal and the optical data signal in the optical data receiving node;
  processing the reference frequency and timing signal and generating an optical return timing signal in response;
  transmitting the optical return timing signal to the optical data transmitting node;
  processing the optical return timing signal, determining latency information regarding the latency of data transfer between the optical data transmitting node and the optical data receiving node, and generating an updated reference frequency and timing signal including the latency information; and
  transmitting the updated reference frequency and timing signal to the optical data receiving node.

The invention has been described by reference to certain embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention, which is defined in the accompanying claims.

The invention claimed is:

1. A method of distributing reference frequency and timing information in a network with pairs of first and second optical fibers in optical fiber connections between network nodes, for transmission of optical data signals separately in mutually opposite directions between the network nodes respectively, the method comprising:
  generating a first timing signal in a first node of the network;
  optically combining the first timing signal with an optical data signal so as to form a combined optical signal for transmission from the first node to a second node of the network;
  transmitting the combined optical signal to the second node via a first optical fiber of an optical fiber connection with a pair of optical fibers between the first node and the second node;
  separating the first timing signal and the optical data signal in the second node;
  transmitting a second timing signal from the second node to the first node via the first optical fiber, wherein the first and second timing signals are respective ones of a reference frequency and timing signal and an optical return signal generated in response to the reference frequency and timing signal;
  receiving the second timing signal at the first node;
  determining latency information regarding the latency of data transfer between the first node and the second node from a time period that has elapsed between sending the reference frequency and timing signal and receiving of the optical return timing signal, wherein the first node comprises a first optical filter coupled to the first optical fiber and an optical supervisory channel transmitter coupled to the first optical filter for transmitting an optical supervisory channel signal to the first optical fiber, the first optical filter being a bidirectional filter, wherein the second node comprises a second optical filter coupled to the first optical fiber and an optical supervisory channel receiver coupled to the second optical filter for receiving the optical supervisory channel signal, the second optical filter being a bidirectional filter; and using a further optical filter coupled between said first optical filter and said optical supervisory channel transmitter to optically combine the first timing signal with the optical supervisory channel signal, the optical supervisory channel signal and the first timing signal having mutually different wavelengths.

2. The method according to claim 1, wherein the optical supervisory channel signal and the first timing signal having mutually different wavelengths, the method comprising using a further optical filter coupled between said second optical filter and said optical supervisory channel receiver to optically split the first timing signal and the optical supervisory channel signal.

3. The method according to claim 1, applied to a network wherein the optical fiber connection comprises an amplifier system and first and second connection parts, each connection part with a pair of optical fibers, coupled between the amplifier system and the first and second node respectively, the amplifier system comprising:

an optical amplifier;

the second optical filter coupled between the first optical fiber of the first connection part and the optical amplifier;

the optical supervisory channel receiver coupled to the second optical filter for receiving the optical supervisory channel signal;

the first optical filter coupled between the optical amplifier and the first optical fiber of the second connection part; and the optical supervisory channel transmitter coupled to the first optical filter for transmitting the optical supervisory channel signal, the method further comprising:

separating the first timing signal and the optical data signal by means of the second optical filter;

amplifying the optical data signal from the second optical filter to provide an amplified first optical data signal;

separately amplifying the first timing signal from the second optical filter to provide an amplified first timing signal;

combining the amplified the optical data signal and the amplified first timing signal in the first optical filter for transmission to the second node via the first optical fiber of the second connection part;

receiving the second timing signal from the first optical fiber of the second connection part in the amplifier system via the first optical filter;

amplifying the second timing signal from the first optical filter to provide an amplified second timing signal; and providing the amplified second timing signal to the second optical filter for transmission to the first node via the first optical fiber of the first connection part.

4. The method according to claim 3, wherein the first timing signal and the second timing signal are both amplified in a bidirectional amplifier of the amplifier system.

5. The method according to claim 1, wherein the first timing signal and the second timing signal are transmitted at mutually different optical wavelengths.

6. The method according to claim 1, wherein the optical data signal is transferred using a plurality of wavelengths within a wavelength range from about 1525 to about 1565 nm, and the first timing signal and the second timing signal have wavelength in ranges of about 1484 to about 1498 nm, and about 1465 nm to about 1478 nm.

7. The method according to claim 1, wherein the optical data signal is transferred using a plurality of wavelengths within a wavelength range from about 1525 to about 1565 nm, the optical supervisory channel signal has a wavelength in a range of about 1504 to about 1518 nm, and the first timing signal and the second timing signal have wavelength in ranges of about 1484 to about 1498 nm, and about 1465 nm to about 1478 nm.

8. The method according to claim 1, wherein the network is a Dense Wavelength Division Multiplexed (DWDM) network.

9. An optical fiber network node for distributing reference frequency and timing information in a network with pairs of first and second optical fibers in optical fiber connections between network nodes for transmission of optical data signals separately in mutually opposite directions between the network nodes respectively, the optical fiber network node comprising:

an optical data transmitter for transmitting an optical data signal to a first optical fiber of an optical fiber connection to a further optical fiber network node;

a reference frequency and timing circuit configured to generate a first timing signal and to receive a second timing signal for determining latency information, wherein the first and second timing signals are respective ones of a reference frequency and timing signal and an optical return signal generated in response to the reference frequency and timing signal;

a first optical filter coupled between the optical data transmitter and the first optical fiber and to the reference frequency and timing circuit, the first optical filter being a bidirectional filter, the first optical filter being configured to combine the first timing signal and the optical data signal, and to receive the second timing signal from the first optical fiber and forward the second timing signal to the reference frequency and timing circuit; and an optical supervisory channel transmitter coupled to the first optical filter for transmitting an optical supervisory channel signal to the first optical fiber via the first optical filter;

wherein the reference frequency and timing circuit and the optical supervisory channel transmitter are configured to generate the first timing signal and the optical supervisory channel signal at mutually different wavelengths, the optical fiber network node comprising a further optical filter coupled between said first optical filter on one hand and said optical supervisory channel transmitter and the reference frequency and timing circuit on the other hand, for combining the first timing signal to the optical supervisory channel signal.

10. The optical fiber network node according to claim 9, wherein the first timing signal and the second timing signal are transmitted and received at mutually different optical wavelengths.

11. An optical fiber network node for distributing reference frequency and timing information in a network with pairs of first and second optical fibers in optical fiber connections between network nodes for transmission of optical data signals separately in mutually opposite directions between the network nodes respectively, the optical fiber network node comprising:
- an optical data transmitter for transmitting an optical data signal to a first optical fiber of an optical fiber connection to a further optical fiber network node;
- a reference frequency and timing circuit configured to generate a first timing signal and to receive a second timing signal for determining latency information, wherein the first and second timing signals are respective ones of a reference frequency and timing signal and an optical return signal generated in response to the reference frequency and timing signal;
- a first optical filter coupled between the optical data transmitter and the first optical fiber and to the reference frequency and timing circuit, the first optical filter being a bidirectional filter, the first optical filter being configured to combine the first timing signal and the optical data signal, and to receive the second timing signal from the first optical fiber and forward the second timing signal to the reference frequency and timing circuit;
- an optical supervisory channel transmitter coupled to the first optical filter for transmitting an optical supervisory channel signal to the first optical fiber via the first optical filter; and
- a further optical filter coupled to the first optical filter, the optical supervisory channel transmitter and the reference frequency and timing circuit, the further optical filter being a bidirectional filter, configured to combine the optical first timing signal and the optical supervisory channel signal and to forward a combination of the optical first timing signal and the optical supervisory channel signal to the first optical filter, and to forward the second timing signal from the first optical filter to the reference frequency and timing circuit.

12. The optical fiber network node according to claim 11, wherein the first timing signal and the second timing signal are transmitted and received at mutually different optical wavelengths.

13. An optical fiber network node for use involving distribution of reference frequency and timing information in a network with pairs of first and second optical fibers in optical fiber connections between network nodes for transmission of optical data signals separately in mutually opposite directions between the network nodes respectively, the optical fiber network node comprising:
- an optical data receiver for receiving an optical data signal from a first optical fiber of an optical fiber connection to a further optical fiber network node;
- an optical data transmitter for transmitting the optical data signal to a second optical fiber of the optical fiber connection;
- a timing and frequency unit with a loopback circuit configured to retrieve, from a first timing signal from the further optical fiber network node, a second timing signal and optically transmit back the second timing signal, wherein the first and second timing signals are respective ones of a reference frequency and timing signal and an optical return signal generated in response to the reference frequency and timing signal;
- a first optical filter coupled to the first optical fiber, the optical data receiver and the a timing and frequency unit, the first optical filter being a bidirectional filter, configured to separate the first timing signal and the first optical data signal and transmit the second timing signal via the first optical fiber;
- an optical supervisory channel receiver for receiving an optical supervisory channel signal having an optical supervisory channel wavelength that differs from a wavelength of the first timing signal; and
- a further optical filter coupled between said first optical filter on one hand and said optical supervisory channel receiver and the loopback circuit on the other hand, to optically split the first timing signal and the optical supervisory channel signal,
- wherein the first timing signal and the second timing signal are received and transmitted at mutually different optical wavelengths.

14. A transmission system for distributing reference frequency and timing information in a network with pairs of first and second optical fibers in optical fiber connections between network nodes for transmission of optical data signals separately in mutually opposite directions between the network nodes respectively, the transmission system comprising a first optical fiber network node and a second optical fiber network node, the first optical fiber network node comprising:
- an optical data transmitter for transmitting an optical data signal to a first optical fiber of an optical fiber connection to the second optical fiber network node;
- a reference frequency and timing circuit configured to generate a first timing signal and to receive a second timing signal for determining latency information, wherein the first and second timing signals are respective ones of a reference frequency and timing signal and an optical return signal generated in response to the reference frequency and timing signal;
- a first optical filter coupled between the optical data transmitter and the first optical fiber and to the reference frequency and timing circuit, the first optical filter being a bidirectional filter configured to combine the first timing signal and the optical data signal, and to receive the second timing signal from the first optical fiber and forward the second timing signal to the reference frequency and timing circuit; and
- an optical supervisory channel transmitter coupled to the first optical filter for transmitting an optical supervisory channel signal to the first optical fiber via the first optical filter;

the second optical fiber network node comprising:
- an optical data receiver for receiving the optical data signal from the first optical fiber;
- a timing and frequency unit with a loopback circuit configured to retrieve the second timing signal from the first timing signal, and optically transmit back the second timing signal;
- a second optical filter coupled to the first optical fiber, the optical data receiver and the timing and frequency unit, the second optical filter being a bidirectional filter configured to separate the first timing signal and the optical data signal and transmitting the second timing signal via the first optical fiber; and
- an optical supervisory channel receiver coupled to the second optical filter for receiving the optical supervisory channel signal from the first optical fiber via the second optical filter,
- wherein the reference frequency and timing circuit and the optical supervisory channel transmitter are configured to generate the optical first timing signal and the optical supervisory channel signal at mutually different wavelengths, and the first optical fiber network node comprising a further optical filter coupled between said first optical filter on one hand and said optical supervisory channel transmitter and the reference frequency and timing circuit on the other hand, for combining the first timing signal to the optical supervisory channel signal.

15. The transmission system according to claim 14, wherein the optical fiber connection comprises an amplifier system and first and second connection parts, each connection part with optical fiber pairs, coupled between the amplifier system and the first and second nodes respectively, the amplifier system comprising
an optical amplifier;
the second optical filter coupled between the first optical fiber of the first connection part and the optical amplifier;
the optical supervisory channel receiver coupled to the second optical filter for receiving the optical supervisory channel signal;
the first optical filter coupled between the optical amplifier and a first optical fiber of the second connection part;
the optical supervisory channel transmitter coupled to the first optical filter for transmitting the optical supervisory channel signal, and
an amplifying means coupled to the first and second optical filters and configured to amplify the first timing signal from the second optical filter to provide an amplified first timing signal to the first optical filter and to amplify the second timing signal from the first optical filter to provide an amplified second timing signal from the first optical filter to the second optical filter.

16. The transmission system according to claim 15, wherein the amplifying means comprises a bidirectional optical amplifier.

17. The transmission system according to claim 15, wherein the amplifier system further comprises:
the optical supervisory channel receiver coupled to the second optical filter for receiving a first optical supervisory channel signal; and
the optical supervisory channel transmitter coupled to the first optical filter for transmitting a second optical supervisory channel signal.

18. An amplifier system for use in the network according to claim 15.

19. A method of installing a reference frequency and timing information function in a network with pairs of first and second optical fibers in optical fiber connections between network nodes for transmission of optical data signals separately in mutually opposite directions between the network nodes respectively, wherein the network comprises an optical data signal transmitter and an optical data signal receiver, first and second optical filters coupled between a first optical fiber of an optical fiber connection and the optical data signal transmitter and the optical data signal receiver respectively, an optical supervisory channel transmitter coupled to the first optical filter for transmitting an optical supervisory channel signal, an optical supervisory channel receiver coupled to the second optical filter for receiving the optical supervisory channel signal, the method comprising:
coupling a reference frequency and timing circuit to a connection of the first optical filter for the optical supervisory channel transmitter, the reference frequency and timing circuit configured to generate an optical first timing signal for transmission over the first optical fiber and to receive a second timing signal from the first optical fiber for determining latency information;
coupling a loopback circuit of a timing and frequency unit to a connection of the second optical filter for the optical supervisory channel receiver, the loopback circuit being configured to retrieve, from the optical first timing signal from the first optical fiber, a second timing signal and optically transmit back the second timing signal over the first optical fiber via the second optical filter; and
adding a third optical filter between a connection of the first optical filter on one hand and the reference frequency and timing circuit and the optical supervisory channel transmitter on the other hand, the third optical filter being a bidirectional optical filter configured to optically combine the optical first timing signal and the optical supervisory channel signal and to direct the second timing signal to the reference frequency and timing circuit.

20. The method according to claim 19, comprising adding a further optical filter between a connection of the second optical filter on one hand and the loopback circuit and timing circuit and the optical supervisory channel receiver on the other hand, the further optical filter being a bidirectional optical filter configured to optically separate the optical first timing signal and the optical supervisory channel signal and to transmit the second timing signal to the first optical fiber.

* * * * *